(12) United States Patent
Yamasaki et al.

(10) Patent No.: US 11,145,873 B2
(45) Date of Patent: Oct. 12, 2021

(54) MEMBRANE ELECTRODE ASSEMBLY AND FUEL CELL COMPRISING CORE-SHELL CATALYST

(71) Applicant: PANASONIC INTELLECTUAL PROPERTY MANAGEMENT CO., LTD., Osaka (JP)

(72) Inventors: Kazuya Yamasaki, Osaka (JP); Hitoshi Ishimoto, Hyogo (JP); Motohiro Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 16/479,881

(22) PCT Filed: Feb. 19, 2018

(86) PCT No.: PCT/JP2018/005641
§ 371 (c)(1),
(2) Date: Jul. 22, 2019

(87) PCT Pub. No.: WO2018/155358
PCT Pub. Date: Aug. 30, 2018

(65) Prior Publication Data
US 2021/0167400 A1 Jun. 3, 2021

(30) Foreign Application Priority Data
Feb. 23, 2017 (JP) .............................. JP2017-031835

(51) Int. Cl.
*H01M 4/92* (2006.01)
*H01M 4/86* (2006.01)
*H01M 8/1004* (2016.01)

(52) U.S. Cl.
CPC ......... *H01M 4/921* (2013.01); *H01M 4/8657* (2013.01); *H01M 4/926* (2013.01); *H01M 8/1004* (2013.01)

(58) Field of Classification Search
None
See application file for complete search history.

(56) References Cited

U.S. PATENT DOCUMENTS

| 2013/0029248 | A1 | 1/2013 | Arai et al. |
| 2015/0104728 | A1* | 4/2015 | Dale .................. H01M 4/9075 429/483 |

FOREIGN PATENT DOCUMENTS

| JP | 2008-153192 A | 7/2008 |
| JP | 2009-205917 A | 9/2009 |

(Continued)

OTHER PUBLICATIONS

International Search Report and Written Opinion issued in International Patent Application No. PCT/JP2018/005641, dated Apr. 24, 2018; with partial English translation.

*Primary Examiner* — Lucas J. O'Donnell
(74) *Attorney, Agent, or Firm* — McDermott Will and Emery LLP

(57) ABSTRACT

A membrane electrode assembly includes an electrolyte membrane, and a pair of electrodes sandwiching the electrolyte membrane. The pair of electrodes each include a catalyst layer, and a gas diffusion layer disposed on the catalyst layer on an opposite side to the electrolyte membrane. At least one of the catalyst layers contains first catalyst particles, and second catalyst particles. The first catalyst particles are either platinum particles or platinum alloy particles, or both. The second catalyst particles are core-shell particles having a core part and a shell part, the core part formed of at least one selected from transition metals other than platinum, the shell part covering the core (Continued)

part and formed of at least one of platinum and a platinum alloy. In the catalyst layer, the second catalyst particles are present in a smaller percentage in an electrolyte membrane side than they are in a gas diffusion layer side.

11 Claims, 1 Drawing Sheet

(56) References Cited

FOREIGN PATENT DOCUMENTS

| | | | |
|---|---|---|---|
| JP | 2010-257720 | A | 11/2010 |
| JP | 2012-195232 | A | 10/2012 |
| JP | 2014-078356 | A | 5/2014 |
| WO | 2011/125196 | A1 | 10/2011 |

* cited by examiner

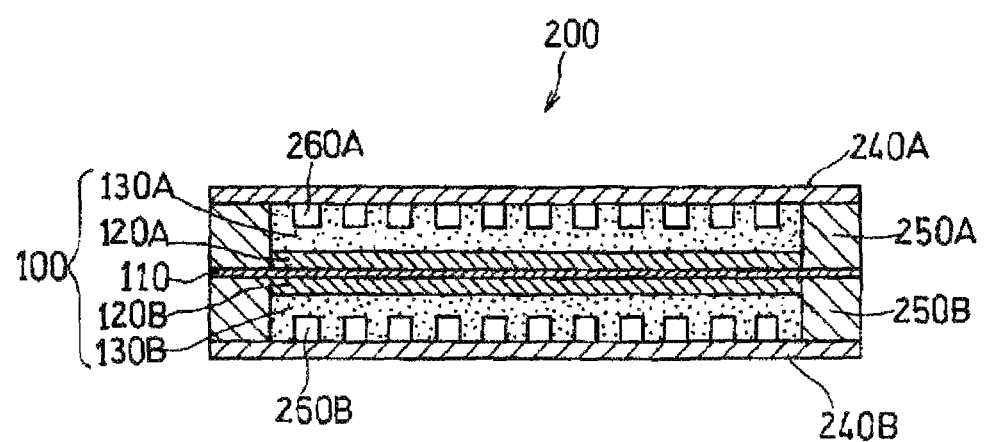

MEMBRANE ELECTRODE ASSEMBLY AND FUEL CELL COMPRISING CORE-SHELL CATALYST

CROSS-REFERENCE OF RELATED APPLICATIONS

This application is the U.S. National Phase under 35 U.S.C. § 371 of International Patent Application No. PCT/JP2018/005641, filed on Feb. 19, 2018, which in turn claims the benefit of Japanese Application No. 2017-031835, filed on Feb. 23, 2017, the entire disclosures of which Applications are incorporated by reference herein.

TECHNICAL FIELD

The present disclosure relates to a membrane electrode assembly including a catalyst layer that contains catalyst particles being core-shell particles, and a fuel cell including the membrane electrode assembly.

BACKGROUND ART

Fuel cells are a highly efficient clean power generator, which generate power through electrochemical reaction of fuel gas and oxidant gas, to produce water. A fuel cell includes, for example, a membrane electrode assembly, and a pair of separators sandwiching the membrane electrode assembly. The membrane electrode assembly includes an electrolyte membrane, and a pair of electrodes sandwiching the electrolyte membrane. The pair of electrodes each include a catalyst layer disposed facing the electrolyte membrane, and a gas diffusion layer disposed on the catalyst layer on an opposite side to the electrolyte membrane. The gas having diffused in the plane direction in the gas diffusion layer is oxidized or reduced in the catalyst layer.

The catalyst layer contains catalyst particles so that the gas reactivity in the catalyst layer can be enhanced. For the catalyst particles, highly catalytically active platinum particles or platinum alloy particles are typically used. Platinum, however, is expensive. To address this, attempts are made to use less amount of platinum by using a transition metal other than platinum (e.g., palladium), which is less expensive than platinum, in combination with platinum. Specifically, one attempt uses core-shell particles comprising a core part formed of a transition metal other than platinum, and a shell part covering the core part and formed of at least one of platinum and a platinum alloy (cf. Patent Literature 1). By using platinum in the shell part, the utilization rate of platinum can be increased. Also, due to the presence of the core part, the particle can have a certain size. Therefore, a high catalytic activity can be obtained.

CITATION LIST

Patent Literature

[PTL 1] Japanese Laid-Open Patent Publication No. 2014-78356

SUMMARY OF INVENTION

The transition metal other than platinum, the metal forming the core part, is likely to be eluted, as compared with platinum forming the shell part. The transition metal other than platinum eluted from the core part can be a cause of deterioration of the electrolyte membrane.

One aspect of the present disclosure relates to a membrane electrode assembly including an electrolyte membrane, and a pair of electrodes sandwiching the electrolyte membrane. The pair of electrodes each include a catalyst layer, and a gas diffusion layer disposed on the catalyst layer on an opposite side to the electrolyte membrane. At least one of the catalyst layers of the pair of electrodes contains first catalyst particles, and second catalyst particles. The first catalyst particles are either platinum particles or platinum alloy particles, or both. The second catalyst particles are core-shell particles that have a core part and a shell part. The core part is formed of at least one selected from transition metals other than platinum. The shell part covers the core part and is formed of at least one of platinum and a platinum alloy. In the catalyst layer of at least one of the electrodes, the second catalyst particles are present in a smaller percentage in an electrolyte membrane side than they are in a gas diffusion layer side.

Another aspect of the present disclosure relates to a membrane electrode assembly. The membrane electrode assembly includes an electrolyte membrane, and a pair of electrodes sandwiching the electrolyte membrane. The pair of electrodes each include a catalyst layer disposed facing the electrolyte membrane, and a gas diffusion layer disposed on the catalyst layer on an opposite side to the electrolyte membrane. At least one of the catalyst layers of the pair of electrodes contains first catalyst particles, and second catalyst particles. The first catalyst particles are either platinum particles or platinum alloy particles, or both. The second catalyst particles are core-shell particles that have a core part and a shell part. The core part is formed of at least one selected from transition metals other than platinum. The shell part covers the core part and is formed of at least one of platinum and a platinum alloy. In the catalyst layer of at least one of the electrodes, the second catalyst particles are present in a smaller percentage in a gas inlet side of said catalyst layer than they are in a gas outlet side of said catalyst layer.

Still another aspect of the present disclosure relates a fuel cell including the above membrane electrode assembly, and a pair of separators sandwiching the membrane electrode assembly.

According to the membrane electrode assembly of the present disclosure, the deterioration of the electrolyte membrane due to elution of the transition metal other than platinum, and others forming the core part of the core-shell particles contained in the catalyst layer can be suppressed. It is therefore possible to provide a fuel cell having excellent durability.

BRIEF DESCRIPTION OF DRAWING

FIG. 1 A cross-sectional view schematically showing a structure of a unit cell of a fuel cell according to an embodiment of the present disclosure.

DESCRIPTION OF EMBODIMENTS

First Embodiment

A membrane electrode assembly according to an embodiment of the present invention includes an electrolyte membrane, and a pair of electrodes sandwiching the electrolyte membrane. The pair of electrodes each include a catalyst layer disposed facing the electrolyte membrane, and a gas diffusion layer disposed on the catalyst layer on an opposite side to the electrolyte membrane. At least one of the catalyst layers of the pair of electrodes contains first catalyst particles and second catalyst particles. The first catalyst particles are either platinum particles or platinum alloy particles, or both. The second catalyst particles are core-shell particles that have a core part and a shell part, the core part formed of at least one selected from transition metals other than platinum, the shell part covering the core part and formed of at least one of platinum and a platinum alloy. In the catalyst layer of at least one of the electrodes, the second catalyst particles are present in a smaller percentage in an electrolyte membrane side than they are in a gas diffusion layer side. Here, the configuration in which the second catalyst particles are present in a smaller percentage in the electrolyte membrane side than they are in the gas diffusion layer side includes a configuration in which the second catalyst particles are absent in the electrolyte membrane side of the catalyst layer.

In the present embodiment, the present percentage of the second catalyst particles (core-shell particles) is varied in the thickness direction of the catalyst layer of at least one of the electrodes. Specifically, in said catalyst layer, the present percentage of the second catalyst particles is reduced in the electrolyte membrane side to be smaller than it is in the gas diffusion layer side. This can reduce the likelihood for the transition metal and others eluted from the core part to come into contact with the electrolyte membrane, and suppress the deterioration of the electrolyte membrane due to the contact between the transition metal and others and the electrolyte membrane.

On the other hand, the present percentage of the second catalyst particles (core-shell particles) is increased in the gas diffusion layer side of the catalyst layer. This can reduce costs.

Here, "the electrolyte membrane side of the catalyst layer" refers to a region a in the catalyst layer, the region being in contact with the electrolyte membrane and having a predetermined thickness t. The thickness t is, for example, 50% of a thickness T of the catalyst layer. In this case, "the gas diffusion layer side of the catalyst layer" refers to a region of remaining 50%, except the region a, in the catalyst layer.

The catalyst layer has, for example, a layer A1 (the electrolyte membrane side) formed on the electrolyte membrane, and a layer A2 (the diffusion layer side) formed on the layer A1. The layer A1 contains the first catalyst particles, and either contains or does not contain the second catalyst particles. The layer A2 contains the second catalyst particles, and either contains or does not contain the first catalyst particles. The present percentage of the second catalyst particles contained in the layer A1 is smaller than that in the layer A2.

When the catalyst layer is constituted of the layers A1 and A2, the present percentage of the second catalyst particles in the layer A1 can be represented by a mass ratio MA1 of the second catalyst particles contained in the layer A1 to a total mass of the first and second catalyst particles contained in the layer A1. The present percentage of the second catalyst particles in the layer A2 can be represented by a mass ratio MA2 of the second catalyst particles contained in the layer A2 to a total mass of the first and second catalyst particles contained in the layer A2.

The mass ratio MA1 and the mass ratio MA2 satisfy a relational expression:

$$0 \leq MA1/MA2 < 1.$$

MA1/MA2 is preferably 0 to 0.8, more preferably 0 to 0.3.

In view of suppressing the deterioration of the electrolyte membrane due to the transition metal and others eluted from the core part, the mass ratio MA1 is preferably 50 mass % or less. The mass ratio MA2 is preferably more than 50 mass %.

In view of reducing the contact between the transition metal and others eluted from the core part and the electrolyte membrane, the layer A1 has a thickness of preferably 0.5 μm or more.

A ratio T1/T2 of a thickness T1 of the layer A1 to a thickness T2 of the layer A2 is, for example, 0.5 to 1.0.

The catalyst layer has a thickness (total thickness of the layers A1 and A2) of, for example, 1 to 100 μm.

The catalyst layer may be constituted by laminating a plurality of layers each containing the first catalyst particles and the second catalyst particles, in such a way that the mass ratio of the second catalyst particles to the total mass of the first and second catalyst particles in the layer becomes gradually smaller from the gas diffusion layer side toward the electrolyte membrane side.

The present percentage of the second catalyst particles in the electrolyte membrane side of the catalyst layer and the present percentage of the second catalyst particles in the gas diffusion layer side of the catalyst layer can be obtained by using, for example, energy dispersive X-ray spectroscopy (abbreviated as EDX). For example, a cross section along the thickness direction of the catalyst layer is observed by using scanning electron microscopy (abbreviated as SEM). The SEM image of the cross section is then subjected to EDX to obtain the present percentage of the second catalyst particles in the electrolyte membrane side of the catalyst layer and that in the gas diffusion layer side of the catalyst layer.

In the catalyst layer of at least one of the electrodes, the first catalyst particles are present preferably in a greater percentage in the electrolyte membrane side than they are in the gas diffusion layer side. Even when the second catalyst particles are present in a small percentage in the electrolyte membrane side, the reactivity can be enhanced in good balance throughout the catalyst layer by increasing the present percentage of the first catalyst particles in the electrolyte membrane side.

The catalyst layer of at least one of the electrodes contains a proton-conductive resin (polymer electrolyte). In this catalyst layer, the proton-conductive resin is present preferably in a greater percentage in the electrolyte membrane side than it is in the gas diffusion layer side. In this catalyst layer, even when the second catalyst particles are present in a small percentage in the electrolyte membrane side, the reactivity of the catalyst layer can be enhanced by increasing the present percentage of the proton-conducive resin in the electrolyte membrane side.

The elution of the transition metal and others from the core part is likely to occur especially on the cathode side. Therefore, the catalyst layer in which the second catalyst particles are present in a smaller percentage in the electrolyte membrane side than they are in the gas diffusion layer side is preferably the catalyst layer on the cathode side.

Second Embodiment

A membrane electrode assembly according to another embodiment of the present invention includes an electrolyte membrane, and a pair of electrodes sandwiching the electrolyte membrane. The pair of electrodes each include a catalyst layer disposed facing the electrolyte membrane, and a gas diffusion layer disposed on the catalyst layer on an opposite side to the electrolyte membrane. At least one of the catalyst layers of the pair of electrodes contains first catalyst particles and second catalyst particles. The first catalyst particles are either platinum particles or platinum alloy particles, or both. The second catalyst particles are core-shell particles that have a core part and a shell part, the core part formed of at least one selected from transition metals other than platinum, the shell part covering the core part and formed of at least one of platinum and a platinum alloy. In the catalyst layer of at least one of the electrodes, the second catalyst particles are present in a smaller percentage in a gas inlet side of said catalyst layer than they are in a gas outlet side of said catalyst layer. Here, the configuration in which the second catalyst particles are present in a smaller percentage in the gas inlet side of said catalyst layer includes a configuration in which the second catalyst particles are absent in the gas inlet side of the catalyst layer.

In the present embodiment, the present percentage of the second catalyst particles (core-shell particles) is varied in the plane direction of the catalyst layer of at least one of the electrodes. Specifically, in said catalyst layer, the present percentage of the second catalyst particles is reduced in the gas inlet side, where power generation tends to concentrate and the transition metal and others are likely to be eluted from the core part, to be smaller than it is in the gas outlet side. This can reduce the elution of the transition metal and others from the core part in the catalyst layer, and suppress the deterioration of the electrolyte membrane due to the elution of the transition metal and others. This can also suppress a decrease in catalytic activity of the second catalyst particles, the decrease in association with the collapse of the core-shell structure (size reduction of the second catalyst particles) due to the elution of the transition metal and others from the core part.

On the other hand, the present percentage of the second catalyst particles is increased in the gas outlet side of the catalyst layer. This can reduce costs.

Here, "the gas inlet side of the catalyst layer" refers to a part of the catalyst layer formed on a predetermined region P of the electrolyte membrane, the region corresponding to the gas inlet side of the catalyst layer, and "the gas outlet side of the catalyst layer" refers to a remaining part of the catalyst layer.

For example, given that the surface of the catalyst layer facing the electrolyte membrane has a rectangular shape, a gas inlet is provided on one side L1 of a set of opposite sides of the rectangular shape, and a gas outlet is provided on the other side L2. In this case, "the gas inlet side of the catalyst layer" is, of two regions formed by dividing the rectangular shape into two along an intermediate line at an equal distance from the side L1 and the side L2, a region b1 including the gas inlet. On the other hand, "the gas outlet side of the catalyst layer" is, of the two regions formed by dividing the rectangular shape into two along the intermediate line at an equal distance from the side L1 and the side L2, a region b2 including the gas outlet. In this case, the predetermined region P of the electrolyte membrane corresponds to the region b1 of the catalyst layer.

The catalyst layer has, for example, a layer B1 (the gas inlet side) formed on the predetermined region P of the electrolyte membrane corresponding to the gas inlet side of the catalyst layer (e.g., region b1), and a layer B2 (the gas outlet side) formed on a region except the predetermined region P of the electrolyte membrane. The layer B1 contains the first catalyst particles, and either contains or does not contain the second catalyst particles. The layer B2 contains the second catalyst particles, and either contains or does not contain the first catalyst particles. The present percentage of the second catalyst particles contained in the layer B1 is smaller than that in the layer B2.

When the catalyst layer is constituted of the layers B1 and B2, the present percentage of the second catalyst particles in the gas inlet side of the catalyst layer (in the layer B1) can be represented by a mass ratio MB1 of the second catalyst particles contained in the layer B1 to a total mass of the first and second catalyst particles contained in the layer B1. The present percentage of the second catalyst particles in the gas outlet side of the catalyst layer (in the layer B2) can be represented by a mass ratio MB2 of the second catalyst particles contained in the layer B2 to a total mass of the first and second catalyst particles contained in the layer B2.

The mass ratio MB1 and the mass ratio MB2 satisfy a relational expression:

$$0 \leq MB1/MB2 < 1.$$

MB1/MB2 is preferably 0 or more and 0.8 or less, more preferably 0 or more and 0.3 or less.

In view of suppressing the deterioration of the electrolyte membrane due to the transition metal and others eluted from the core part, the mass ratio MB1 is preferably 50 mass % or less. The mass ratio MB2 is preferably more than 50 mass %.

The catalyst layer (layers B1 and B2) has a thickness of, for example, 1 to 100 µm.

The present percentage of the second catalyst particles in the gas inlet side of the catalyst layer and the present percentage of the second catalyst particles in the gas outlet side of the catalyst layer can be obtained by using, for example, energy dispersive X-ray spectroscopy (EDX). For example, a principal surface of the catalyst layer in the electrolyte membrane side or in the gas diffusion layer side is observed by using a scanning electron microscopy (SEM). The SEM image of the principal surface is then subjected to EDX to obtain the present percentage of the second catalyst particles in the gas inlet side of the catalyst layer and that in the gas outlet side of the catalyst layer.

The elution of the transition metal and others from the core part is likely to occur especially on the cathode side. Therefore, the catalyst layer in which the second catalyst particles are present in a smaller percentage in the gas inlet side than they are in the gas outlet side is preferably the catalyst layer on the cathode side.

Although in the present embodiment, "the gas inlet side of the catalyst layer" refers to a part of the catalyst layer formed on the predetermined region P, and "the gas outlet side of the catalyst layer" refers to a remaining part of the catalyst layer, they are not limited thereto. For example, the catalyst layer may be divided into three regions b1, b3, and b2 from the side L1 (on the gas inlet side) of the catalyst layer toward the side L2 (on the gas outlet side), and the regions b1, b2, and b3 may be referred to as "the gas inlet side", "the gas outlet side", and a gas midsection of the catalyst layer, respectively. In this case, the percentage of the second catalyst particles may be reduced in the order of the region b2, b3, and b1, to be smallest in the region b1.

In the following, matters common to First and Second Embodiments will be described.

(First Catalyst Particles)

The first catalyst particles are either platinum particles or platinum alloy particles, or both. The platinum alloy forming the first catalyst particles is mainly composed of platinum. Here, "mainly composed of" means that the platinum content in the platinum alloy is 90 mass % or more and less than 100 mass %. Examples of metal elements other than platinum contained in the platinum alloy include iridium, ruthenium, rhodium, nickel, gold, cobalt, palladium, silver, iron, and copper. These metals can be used singly or in combination of two or more kinds.

The first catalyst particles have an average particle size of, for example, 0.5 to 10 nm.

(Second Catalyst Particles)

The shell part of the second catalyst particles is formed of at least one of platinum and a platinum alloy, which have high catalytic activity. For the platinum alloy, the platinum alloy used in the first catalyst particles can be used.

The core part of the second catalyst particles is formed of at least one selected from transition metals other than platinum.

Examples of the transition metals other than platinum include palladium, copper, iron, nickel, cobalt, ruthenium, rhodium, silver, and gold. Among transition metals, copper, iron, nickel, and cobalt are advantageous in cost, but on the other hand, they are likely to be eluted. In this configuration, the effect of suppressing the deterioration of the electrolyte membrane due to elution of the transition metal can be remarkably obtained.

The various metals as mentioned above may be used singly or in combination of two or more kinds. When two or more kinds are used in combination, they may be used in the form of an alloy.

The mass ratio of the core part to the shell part in the second catalyst particles is, for example, 100:(50 to 200).

When voids are formed in the second catalyst particles due to elution of the transition metal and others of the core part, the second catalyst particles (shell parts) are likely to agglomerate to each other. Accordingly, the second catalyst particles tend to agglomerate to each other more easily than the first catalyst particles. Therefore, in the catalyst layer of at least one of the electrodes, the second catalyst particles are preferably present in a smaller percentage than the first catalyst particles. This can reduce an increase in the elution amount of the transition metal from the second catalyst particles, and reduce the agglomeration of the second catalyst particles. In particular, it is preferable to reduce the agglomeration of the second catalyst particles in the electrolyte membrane side or in the gas inlet side.

In terms of cost and reducing the agglomeration of the second catalyst particles, the amount of the second catalyst particles contained in the catalyst layer is preferably 30 parts by mass or more and 70 parts by mass or less, per 100 parts by mass of the total of the first and second catalyst particles.

The second catalyst particles preferably have a larger average particle size than the first catalyst particles. This can reduce the agglomeration of the second catalyst particles. In view of securing the catalytic activity of the second catalyst particles and reducing the agglomeration thereof, the average particle size of the second catalyst particles is preferably 2 nm or more and 10 nm or less.

(Catalyst Layer)

The catalyst layer contains, for example, a carbon material, catalyst particles, and a proton-conductive resin. The carbon material is fibrous and/or particulate. For the catalyst particles, the first catalyst particles or the second catalyst particles as mentioned above can be used.

Examples of the fibrous carbon material include vapor growth carbon fibers (abbreviated as VGCF), carbon nanotubes, and carbon nanofibers. The fibrous carbon material may be of any length.

The particulate carbon material is not particularly limited, and is preferably carbon black in terms of its excellent electrical conductivity. Examples of the carbon black include acetylene black, Ketjen black, thermal black, furnace black, and channel black. The particle size thereof (or the length of a structure composed of primary particles joined together) may be any value, and any carbon black conventionally used for the catalyst layer of fuel cells can be used.

At least some of the first and second catalyst particles are supported on the carbon material. Preferably, the catalyst particles are supported on the particulate carbon material, as well as on the fibrous carbon material. The catalyst particles can more easily come into contact with the gas, allowing the oxidation or reduction reaction of the gas to proceed more efficiently.

The proton-conductive resin is not particularly limited, and examples thereof include perfluorocarbon sulfonic acid-based polymers, and hydrocarbon-based polymers. Among them, for example, perfluorocarbon sulfonic acid-based polymers are preferable in terms of their excellent heat resistance and chemical stability. Examples of the perfluorocarbon sulfonic acid-based polymers include Nafion (registered trademark).

In the catalyst layer, the fibrous carbon material is contained in an amount of preferably 3 parts by mass or more and 15 parts by mass or less, more preferably 5 parts by mass or more and 10 parts by mass or less, per 100 parts by mass of the total of the catalyst particles, the particulate carbon material, and the proton-conductive resin. This is because the fibrous carbon materials can be readily disposed in a desired state, and the gas diffusion and the electrochemical reaction can be allowed to proceed more efficiently. From the same reason, the ratio of the fibrous carbon material to the whole carbon material combining the particulate carbon material and the fibrous carbon material is preferably 10 mass % or more and 50 mass % or less, more preferably 15 mass % or more and 30 mass % or less.

The catalyst layer can be formed by, for example, applying a catalyst ink containing the catalyst particles onto a surface of the electrolyte membrane, and drying the ink. The catalyst ink contains, other than the catalyst particles, the carbon material, the proton-conductive resin, and a dispersion medium. Examples of the dispersion medium include water, ethanol, and propanol.

Examples of the application method include spraying, screen printing, and coating methods using various coaters, such as a blade coater, a knife coater, and a gravure coater.

An example method of forming a catalyst layer in which the second catalyst particles are present in a smaller percentage in the electrolyte membrane side than they are in the gas diffusion layer side is shown below.

First, a catalyst ink A1 and a catalyst ink A2 are prepared. The catalyst ink A1 contains the first catalyst particles, and either contains or does not contain the second catalyst particles. The catalyst ink A2 contains the second catalyst particles, and either contains or does not contain the first catalyst particles. The present percentage of the second catalyst particles in the catalyst ink A1 is smaller than that in the catalyst ink A2.

The present percentage of the second catalyst particles in the catalyst ink A1 can be represented by a mass ratio Ma1 of the second catalyst particles contained in the catalyst ink A1 to a total mass of the first and second catalyst particles contained in the catalyst ink A1. The present percentage of the second catalyst particles in the catalyst ink A2 can be represented by a mass ratio Ma2 of the second catalyst particles contained in the catalyst ink A2 to a total mass of the first and second catalyst particles contained in the catalyst ink A2.

The mass ratio Ma1 and the mass ratio Ma2 satisfy a relational expression:

$$0 \leq Ma1/Ma2 < 1.$$

Ma1/Ma2 is preferably 0 or more and 0.8 or less, more preferably 0 or more and 0.3 or less.

Next, the catalyst ink A1 is applied onto a surface of the electrolyte membrane and then dried, to form a layer A1. Thereafter, the catalyst ink A2 is applied onto a surface of the layer A1 and then dried, to form a layer A2.

Another example method of forming a catalyst layer in which the second catalyst particles are present in a smaller percentage in the electrolyte membrane side than they are in the gas diffusion layer side is shown below.

First, a plurality of catalyst inks each containing the first catalyst particles and the second catalyst particles and having different present percentages of the second catalyst particles are prepared. Beginning with the ink having the smallest present percentage of the second catalyst particles, in the increasing order of the percentage, the inks are applied and then dried one after another, on a surface of the electrolyte membrane.

An example method of forming a catalyst layer in which the second catalyst particles are present in a smaller percentage in the gas inlet side than they are in the gas outlet side is shown below.

First, a catalyst ink B1 and a catalyst ink B2 are prepared. The catalyst ink B1 contains the first catalyst particles, and either contains or does not contain the second catalyst particles. The catalyst ink B2 contains the second catalyst particles, and either contains or does not contain the first catalyst particles. The present percentage of the second catalyst particles in the catalyst ink B1 is smaller than that in the catalyst ink B2.

The present percentage of the second catalyst particles in the catalyst ink B1 can be represented by a mass ratio Mb1 of the second catalyst particles contained in the catalyst ink B1 to a total mass of the first and second catalyst particles contained in the catalyst ink B1. The present percentage of the second catalyst particles in the catalyst ink B2 can be represented by a mass ratio Mb2 of the second catalyst particles contained in the catalyst ink B2 to a total mass of the first and second catalyst particles contained in the catalyst ink B2.

The mass ratio Mb1 and the mass ratio Mb2 satisfy a relational expression:

$$0 \leq Mb1/Mb2 < 1.$$

Mb1/Mb2 is preferably 0 or more and 0.8 or less, more preferably 0 or more and 0.3 or less.

Next, after placing a sheet-like masking member on the electrolyte membrane at a region except the predetermined region P that corresponds to the gas inlet side of the catalyst layer, the catalyst ink B1 is applied, and then dried, to form a layer B1 on the predetermined region P of the electrolyte membrane. After removing the masking member, another sheet-like masking member is placed on the layer B1. Subsequently, the catalyst ink B2 is applied onto the region except the predetermined region P, and dried, to form a layer B2.

(Electrolyte Membrane)

The electrolyte membrane is preferably a polymer electrolyte membrane. Examples of the material of the polymer electrolyte membrane include polymer electrolytes exemplified as the proton-conductive resin. The electrolyte membrane has a thickness of, for example, 5 to 30 μm.

(Gas Diffusion Layer)

The gas diffusion layer may be either a structure having a substrate layer or a structure not having a substrate layer. The structure having a substrate layer is, for example, a structure body having a substrate layer and a microporous layer provided on the side facing the catalyst layer. The substrate layer may be an electrically conductive porous sheet, such as carbon cross or carbon paper. The microporous layer may be, for example, a mixture of a water-repellent resin such as fluorocarbon resin, an electrically conductive carbon material, and a proton-conductive resin (polymer electrolyte). The structure not having a substrate layer is, for example, a molded body of a composite material or a composition containing a water-repellent resin such as fluorocarbon resin, an electrically conductive carbon material, and others. Examples of the water-repellent resin include fluorocarbon resins such as PTFE (polytetrafluoroethylene). Examples of the conductive carbon material include graphite and carbon black. The conductive carbon material may be particulate or fibrous.

Third Embodiment

A fuel cell according to an embodiment of the present invention includes the membrane electrode assembly of First Embodiment or Second Embodiment, and a pair of separators sandwiching the membrane electrode assembly. Since the deterioration of the electrolyte membrane due to elution of the transition metal other than platinum from the core part of the core-shell particles contained in the catalyst layer can be suppressed, stable power generation performance can be obtained.

In the following, an example structure of the fuel cell according to the embodiment of the present disclosure is described below with reference to FIG. 1. FIG. 1 is a cross-sectional view schematically showing the structure of a unit cell included in the fuel cell according to an embodiment of the present invention. Typically, a plurality of unit cells are stacked together, and included as a cell stack in the fuel cell. In FIG. 1, one unit cell is shown for convenience.

A unit cell 200 includes an electrolyte membrane 110, a first catalyst layer 120A, a second catalyst layer 120B, a first gas diffusion layer 130A, a second gas diffusion layer 130B, a first separator 240A, and a second separator 240B. The first catalyst layer 120A and the second catalyst layer 120B are disposed so as to sandwich the electrolyte membrane 110. The first gas diffusion layer 130A and the second gas diffusion layer 130B are disposed so as to sandwich the electrolyte membrane 110, with the first catalyst layer 120A and the second catalyst layer 120B respectively interposed therebetween. The first separator 240A and the second separator 240B are disposed so as to sandwich the electrolyte membrane 110, with the first gas diffusion layer 130A and the second gas diffusion layer 130B respectively interposed therebetween. One of the first and second catalyst layers 120A and 120B functions as an anode, and the other functions as a cathode. Since the electrolyte membrane 110 is slightly larger than the first and the second catalyst layer 120A and 120B, the peripheral edge portion of the electrolyte membrane 110 extends beyond the first and the second catalyst layer 120A and 120B. The peripheral edge portion of the electrolyte membrane 110 is held between a pair of seal members 250A and 250B.

At least one of the first and second catalyst layers 120A and 120B contains the first catalyst particles and the second catalyst particles, and the second catalyst particles are present in a smaller percentage in the electrolyte membrane side than they are in the gas diffusion layer side, or present in a smaller percentage in the gas inlet side than they are in the gas outlet side. When the first catalyst layer 120A or the second catalyst layer 120B is neither the catalyst layer of the first embodiment nor that of the second embodiment, any known material and any known configuration can be employed for the catalyst layer.

(Separator)

The first separator 240A and the second separator 240B may be made of any material that has airtightness, electron conductivity, and electrochemical stability. Preferable examples of such materials include carbon materials, and metal materials. The metal material may be coated with carbon. For example, a metal sheet is cut by punching in a predetermined shape, and applying surface treatment thereto, to give the first separator 240A and the second separator 240B.

In the present embodiment, the first gas diffusion layer 130A is provided with a gas flow channel 260A, on a surface abutting the first separator 240A. The second gas diffusion layer 130B is provided with a gas flow channel 260B, on a surface abutting the second separator 240B. It is therefore unnecessary to form a gas flow channel on the first separator 240A and the second separator 240B. The gas flow channel may be of any shape, and can be formed in a shape of, for example, parallel channel, or serpentine channel. When the first gas diffusion layer 130A or the second gas diffusion layer 130B does not have the gas flow channel 260A or 260B, a gas flow channel is formed on a surface of the corresponding separator, the surface facing the gas diffusion layer.

(Seal Member)

The seal members 250A and 250B are a material having elasticity, and prevent leakage of fuel and/or oxidant from the gas flow channels 260A and 260B. For example, the seal members 250A and 250B each have a frame-like shape continuously surrounding the peripheral edge portion of the first and the second catalyst layer 220A and 220B. Any known material and any known configuration can be employed for the seal members 250A and 250B.

INDUSTRIAL APPLICABILITY

The fuel cell according to the present disclosure can be suitably used, for example, as a stationary power supply for a household cogeneration system, and a vehicle power supply. The present invention can be suitably applied to a polymer electrolyte fuel cell, but is not limited thereto, and can be applied to fuel cells in general.

REFERENCE SIGNS LIST

100 Membrane-electrode assembly
110 Electrolyte membrane
120A First catalyst layer
120B Second catalyst layer
130A First gas diffusion layer
130B Second gas diffusion layer
200 Fuel cell (Unit cell)
240A First separator
240B Second separator
250A, 250B Seal member
260A, 260B Gas flow channel

The invention claimed is:

1. A membrane electrode assembly comprising an electrolyte membrane, and a pair of electrodes sandwiching the electrolyte membrane, wherein the pair of electrodes each include a catalyst layer, and a gas diffusion layer disposed on the catalyst layer on an opposite side to the electrolyte membrane, at least one of the catalyst layers of the pair of electrodes contains first catalyst particles, and second catalyst particles, the first catalyst particles are either platinum particles or platinum alloy particles, or both, the second catalyst particles are core-shell particles that have a core part and a shell part, the core part comprising at least one selected from the group consisting of transition metals other than platinum, the shell part covering the core part and comprising at least one of platinum and a platinum alloy, and in the catalyst layer of at least one of the electrodes, the second catalyst particles are present in a smaller percentage in an electrolyte membrane side than they are in a gas diffusion layer side.

2. The membrane electrode assembly of claim 1, wherein the catalyst layer of at least one of the electrodes contains a proton-conductive resin, and in said catalyst layer, the proton-conducive resin is present in a greater percentage in the electrolyte membrane side than it is in the gas diffusion layer side.

3. A membrane electrode assembly comprising an electrolyte membrane, and a pair of electrodes sandwiching the electrolyte membrane, wherein the pair of electrodes each include a catalyst layer, and a gas diffusion layer disposed on the catalyst layer on an opposite side to the electrolyte membrane, at least one of the catalyst layers of the pair of electrodes contains first catalyst particles, and second catalyst particles, the first catalyst particles are either platinum particles or platinum alloy particles, or both, the second catalyst particles are core-shell particles that have a core part and a shell part, the core part comprising a transition metal other than platinum, the shell part covering the core part and comprising at least one of platinum and a platinum alloy, and in the catalyst layer of at least one of the electrodes, the second catalyst particles are present in a smaller percentage in a gas inlet side of said catalyst layer than they are in a gas outlet side of said catalyst layer.

4. The membrane electrode assembly of claim 1, wherein the transition metal is at least one selected from the group consisting of copper, iron, nickel, cobalt, ruthenium, rhodium, iridium, silver, and gold.

5. The membrane electrode assembly of claim 1, wherein in the catalyst layer of at least one of the electrodes, the second catalyst particles are present in a smaller percentage than the first catalyst particles.

6. The membrane electrode assembly of claim 1, wherein the second catalyst particles have a larger average particle size than the first catalyst particles.

7. A fuel cell comprising
the membrane electrode assembly of claim 1, and
a pair of separators sandwiching the membrane electrode assembly.

8. The membrane electrode assembly of claim 3, wherein the transition metal is at least one selected from the group consisting of copper, iron, nickel, cobalt, ruthenium, rhodium, iridium, silver, and gold.

9. The membrane electrode assembly of claim 3, wherein in the catalyst layer of at least one of the electrodes, the second catalyst particles are present in a smaller percentage than the first catalyst particles.

10. The membrane electrode assembly of claim 3, wherein the second catalyst particles have a larger average particle size than the first catalyst particles.

11. A fuel cell comprising
the membrane electrode assembly of claim 3, and
a pair of separators sandwiching the membrane electrode assembly.

* * * * *